United States Patent
Lai (10) Patent No.: US 8,634,710 B2
(45) Date of Patent: Jan. 21, 2014

(54) UNDERWATER CAMERA HOUSING (71) Applicant: Nauticam International Limited, New Territories (HK)

(72) Inventor: Yuk Shing Lai, Fotan (HK)

(73) Assignee: Nauticam International Limited, New Territories (HK)

( * ) Notice: Subject to any disclaimer, the term of this patent is extended or adjusted under 35 U.S.C. 154(b) by 0 days.

(21) Appl. No.: 13/748,105

(22) Filed: Jan. 23, 2013

(65) Prior Publication Data

US 2013/0188941 A1 Jul. 25, 2013

Related U.S. Application Data (60) Provisional application No. 61/589,678, filed on Jan. 23, 2012.

(51) Int. Cl.
*G03B 17/08* (2006.01)

(52) U.S. Cl.
USPC .......................... 396/27; 348/81; 348/333.01

(58) Field of Classification Search
USPC ........................................ 396/25–29; 348/81
See application file for complete search history.

(56) References Cited

U.S. PATENT DOCUMENTS 8,123,418 B2 * 2/2012 Fujii ............................. 396/354
8,224,167 B2 * 7/2012 Lai ................................. 396/25

FOREIGN PATENT DOCUMENTS

JP 2008281704 A * 11/2008 ............. G03B 17/08

OTHER PUBLICATIONS

Alex Mustard ("Using the Olympus OM-D E-M5 underwater", http://wetpixel.com/articles/using-the-olympus-om-d-e-m5-underwater, dated Nov. 26, 2012 and accessed Sep. 5, 2013).*

* cited by examiner

*Primary Examiner* — Clayton E Laballe
*Assistant Examiner* — Leon W Rhodes, Jr.
(74) *Attorney, Agent, or Firm* — Young & Thompson (57) ABSTRACT

Disclosed is an underwater camera housing capable of receiving and holding a camera having an electronic viewfinder and a proximity sensor. The housing carries an element to optionally allow or substantially prevent the operation of the proximity sensor. In one embodiment the mechanism to optionally allow or substantially prevent the operation of the proximity sensor includes a material substantially non-reflective to electromagnetic waves emitted for receipt by the proximity sensor. In a second embodiment the mechanism to optionally allow or substantially prevent the operation of the proximity sensor includes a substantially reflective device able to reflect sufficient electromagnetic waves emitted for receipt by the proximity sensor away from the proximity sensor so as to substantially prevent operation of the proximity sensor.

20 Claims, 7 Drawing Sheets

UNDERWATER CAMERA HOUSING

FIELD OF THE INVENTION

The invention relates particularly to a method to facilitate switching between the electronic viewfinder and the monitor of a digital camera equipped with an electromagnetic proximity sensor

BACKGROUND OF INVENTION

In photography, viewfinders are used to display the actual image formed by a lens and is a means for a photographer to aim accurately and to compose his shot.

In modern digital single lens reflex (DSLR) cameras, the image formed by the lens is projected to a mirror in front of the sensor, hinged at 45°, which reflects the image upwards to a horizontal focusing screen; this image is further projected and then reflected several times within a pentaprism before reaching the viewfinder eyepiece; the pentaprism is in place so that the image seen through the eyepiece is right way up and right way laterally. When the shutter release is pressed, the mirror flips out of the way almost instantaneously to expose the sensor to the image formed by the lens, during this time the display in the viewfinder is not available. DSLRs also feature a monitor for reviewing taken pictures, displaying and adjusting settings.

Recently, another form of viewfinder, the electronic viewfinder or EVF has become increasing popular, mainly due to the reduction in size of the camera; an EVF displays the image directly captured by electronically by the sensor, eliminating the need for the mirror and the pentaprism. Furthermore, unlike optical viewfinders in DSLR cameras, the EVF can also display previously taken pictures for review.

Usually, cameras that employ the EVF also have monitors; sometimes the monitor can be used for aiming and composing, since the display is larger and it allows the photographer to be further away from the camera while composing; this is necessary when shooting at special angles, such as from above, below or when it is impossible for the photographer to get close to the object. The monitor is also useful when shooting videos with the camera, as it is desirable for the photographer to be able to look at the whole surrounding environment with his eyes rather than merely looking at the image through the viewfinder.

On the other hand, the EVF is sometimes preferred because the photographer can bring the camera closer to his body; this is a more stable position minimizing vibration of the camera and blurred images. The EVF is also necessary when shooting in bright light as it is very difficult to see the display in the monitor; the EVF also supports dioptric adjustments for short or long sighted photographers.

In order to save battery power, these cameras are often designed so that either the EVF or the monitor is on at any instance and an electromagnetic proximity sensor is used so that when an object, such as a human eye, gets close to the EVF, it will automatically switch on while the monitor switches off at the same time.

In underwater photography, a housing is used to protect the camera from water ingress, it also contains means for the photographer to access some or all controls of the camera placed within the housing.

When a digital camera equipped with a proximity sensor for switching between the EVF and monitor is placed inside a housing, a problem arises since the volume surrounding the camera inside the housing is often relatively small so that the housing itself can cause activation of the proximity sensor which turns the EVF on and the monitor off. This means that photographers cannot use the monitor for composing, reviewing and adjusting settings, which is extremely undesirable for underwater usage.

Some cameras allow the photographer to choose which of the EVF or the monitor he would like to turn on. However, the photographer has to go into menu of the camera to make the selection and to switch between the two; the amount of time that its takes to make the selection varies from camera to camera but it could take as long as a couple of minutes. Other cameras do not support such a function, meaning that the EVF is permanently on and the monitor is permanently off when the camera is placed inside a housing.

This is disadvantageous and limits the effectiveness of a camera when used in an underwater camera housing.

PRIOR REFERENCES

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications may be referred to herein; this reference does not constitute an admission that any of these documents form part of the common general knowledge in the art, in New Zealand or in any other country.

DEFINITIONS

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

OBJECT OF THE INVENTION

It is an object of the invention to provide a method of switching between an electronic viewfinder and a monitor that ameliorates some of the disadvantages and limitations of the known art or at least provide the public with a useful choice.

Thus in a preferred form this invention aims to provide a method to allow easy and quick switching between the EVF and the monitor for this type to camera for underwater photograph

SUMMARY OF INVENTION

In a first aspect the invention resides in an underwater camera housing capable of receiving and holding a camera having an electronic viewfinder and a proximity sensor, the housing carrying means to optionally allow or substantially prevent the operation of the proximity sensor.

Preferably the means to optionally allow or substantially prevent the operation of the proximity sensor comprises a substantially absorbent material substantially non-reflective to electromagnetic waves emitted for receipt by the proximity sensor.

Alternatively the means to optionally allow or substantially prevent the operation of the proximity sensor comprises a substantially reflective device able to reflect sufficient electromagnetic waves emitted for receipt by the proximity sensor away from the proximity sensor so as to substantially prevent operation of the proximity sensor.

Preferably the reflective device is a mirror.

Preferably the means to optionally allow or substantially prevent the operation of the proximity sensor is movable by a control mechanism accessible to a user from the exterior of the housing.

Preferably the absorbent material is mounted on a shaft passing through the housing and is rotatable from a position exterior to the housing.

Preferably the reflective device is mounted on a sliding block movable from the exterior of the housing.

In a further aspect the invention consists in an underwater camera housing as described in any one of the preceding paragraphs having a camera positioned therein, the means to optionally allow or prevent the operation of the proximity sensor being positioned adjacent the proximity sensor of the camera.

In a still further aspect the invention consists in a method of switching between an electronic viewfinder and a monitor of a camera within an underwater camera housing comprising the step of operating a mechanism from a point exterior to the housing which optionally allows or substantially prevents the operation of a proximity sensor mounted on the camera.

BRIEF DESCRIPTION

The invention will now be described, by way of example only, by reference to the accompanying drawings.

DESCRIPTION OF THE PREFERRED EMBODIMENT(S)

The following description will describe the invention in relation to preferred embodiments of the invention, namely a method of switching between an electronic viewfinder and a monitor The invention is in no way limited to these preferred embodiments as they are purely to exemplify the invention only and that possible variations and modifications would be readily apparent without departing from the scope of the invention which is defined in the claims.

This invention relates to a method that facilitates easy and quick switching between the electronic viewfinder (EVF) and the monitor (LCD) of a digital camera by means of an external control incorporated in an underwater camera housing. In particular, this invention is applicable to digital cameras that are equipped with an electromagnetic proximity sensor, for instance an infrared proximity sensor, which is usually placed near the EVF and automatically switches the EVF "on" and the monitor "off" when an object, such as a human eye, gets close to the EVF.

The proximity sensors found in a typical EVF digital cameras is of an electromagnetic type. This type of sensors emits an electromagnetic wave, the most widely-used wave being infrared, and is activated when there is a return signal, reflected by an object in front of it. The present invention therefore relates to the prevention of the proximity sensor from receiving a return signal.

Figure 1:
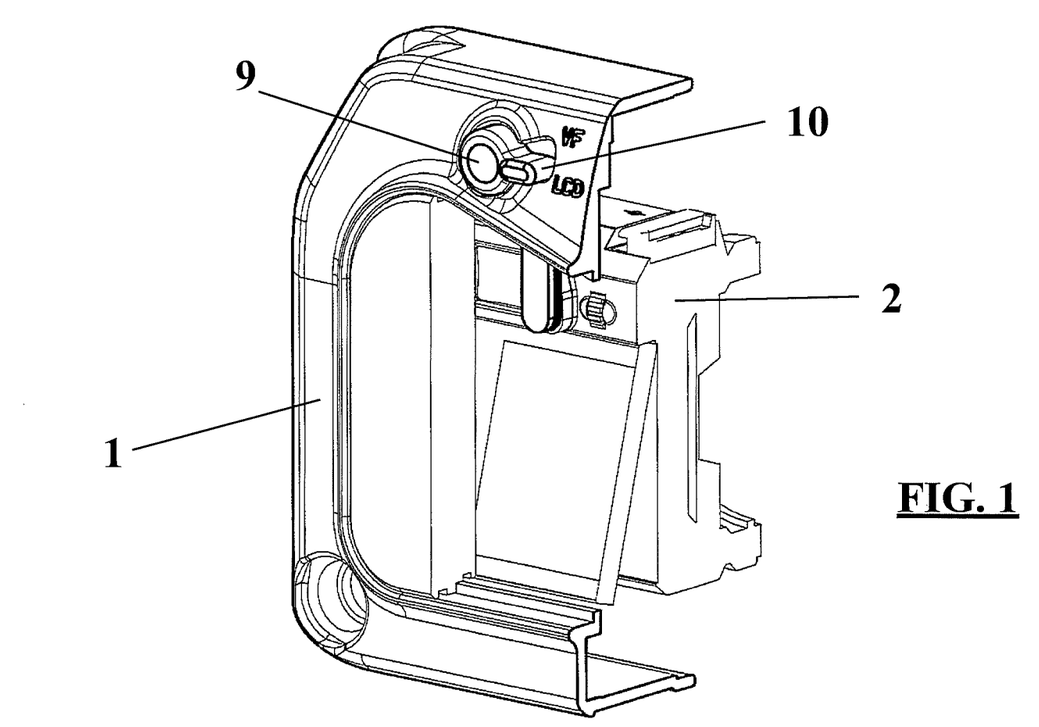
FIG. 1 is a partial drawing of an underwater camera housing and a camera having a proximity sensor in accordance with a first preferred embodiment of the invention showing a means to optionally allow or substantially prevent the operation of the proximity sensor in a first position.
Figure 2:
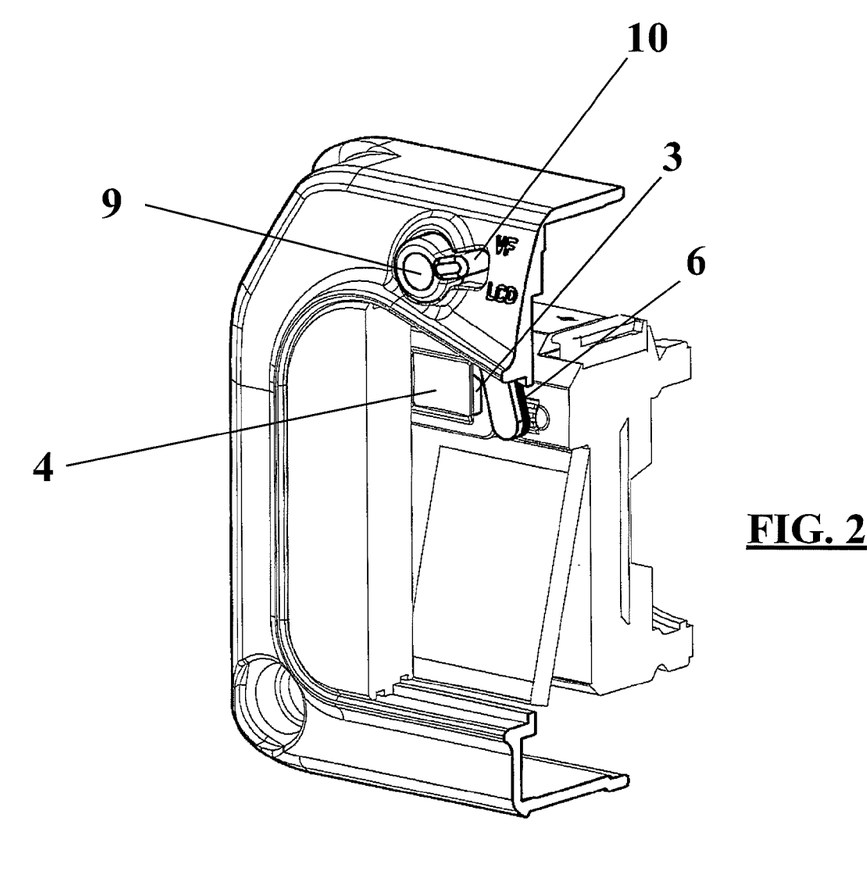
FIG. 2 is a view as in FIG. 1 with the means to optionally allow or substantially prevent the operation of the proximity sensor in a second position.
Figure 3:
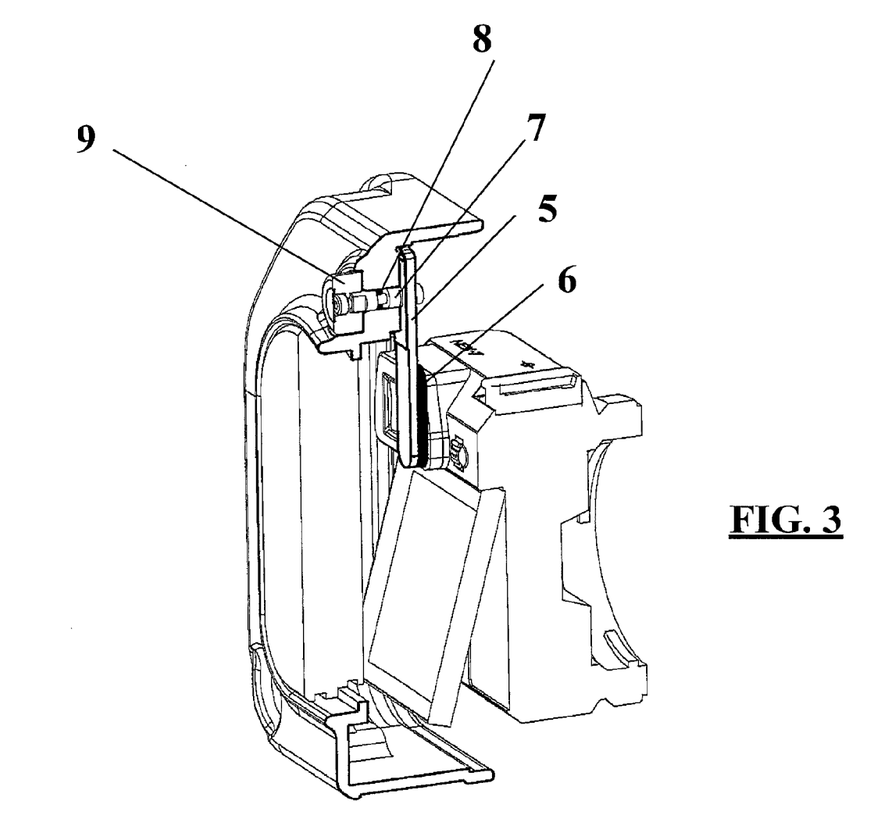
FIG. 3 is a view as in FIG. 1 showing further detail of the control mechanism.

The first method as shown in FIGS. 1 to 3 is by absorbing some, if not all of the electromagnetic wave emitted by the sensor, so that there is little or no return signal. This is achieved with the aid of a typically black, non-reflective surface such as black velvet, placed in front of the proximity sensor. An external control lets the photographer place or remove this black, non-reflective surface from the proximity sensor, hence allowing him to switch between the EVF and the monitor underwater while the camera is placed inside the housing.

Thus a housing for an underwater camera 1 when in use carries a camera 2 having a proximity sensor 3 positioned beside the electronic viewfinder 4. A member in the form of an arm 5 carries a material 6 that substantially absorbs the electromagnetic waves emitted by the proximity sensor 3 for receipt by the sensor 3 when reflected by a close object. The material 6 could be a black material such as black velvet as stated above. The arm 5 is mounted on a shaft 7 which passes through the housing wall, being sealed against water ingress for example by an "O"-ring 8.

Externally of the housing the shaft 7 carries a knob 9 to allow easy rotation of the shaft 7 and the arm 5 to move the material 6 between the position shown in FIG. 1 where the material 6 significantly covers the proximity sensor 3, preventing its operation and causing the camera 2 to operate in monitor mode.

When the shaft 7 is rotated so that the material 6 is positioned substantially as shown in FIG. 2 the proximity sensor is allowed to operate and the camera will operate in viewfinder mode.

As can be seen in FIGS. 1 to 3 suitable markings may be provided on the housing and the knob 9 may carry a tang 10 to indicate the mode of operation of the camera. In the figures these markings are "VF" and "LCD" and can be seen in FIGS. 1, 2, 4 and 5.

The second method of preventing the proximity sensor from receiving a return signal is by reflecting the electromagnetic wave emitted by the sensor at an angle, so that none of the wave returns to the sensor; this is done by placing an extremely reflective surface at approximately 45° in front of the sensor. An example of such a reflective surface is a minor.

Figure 4:
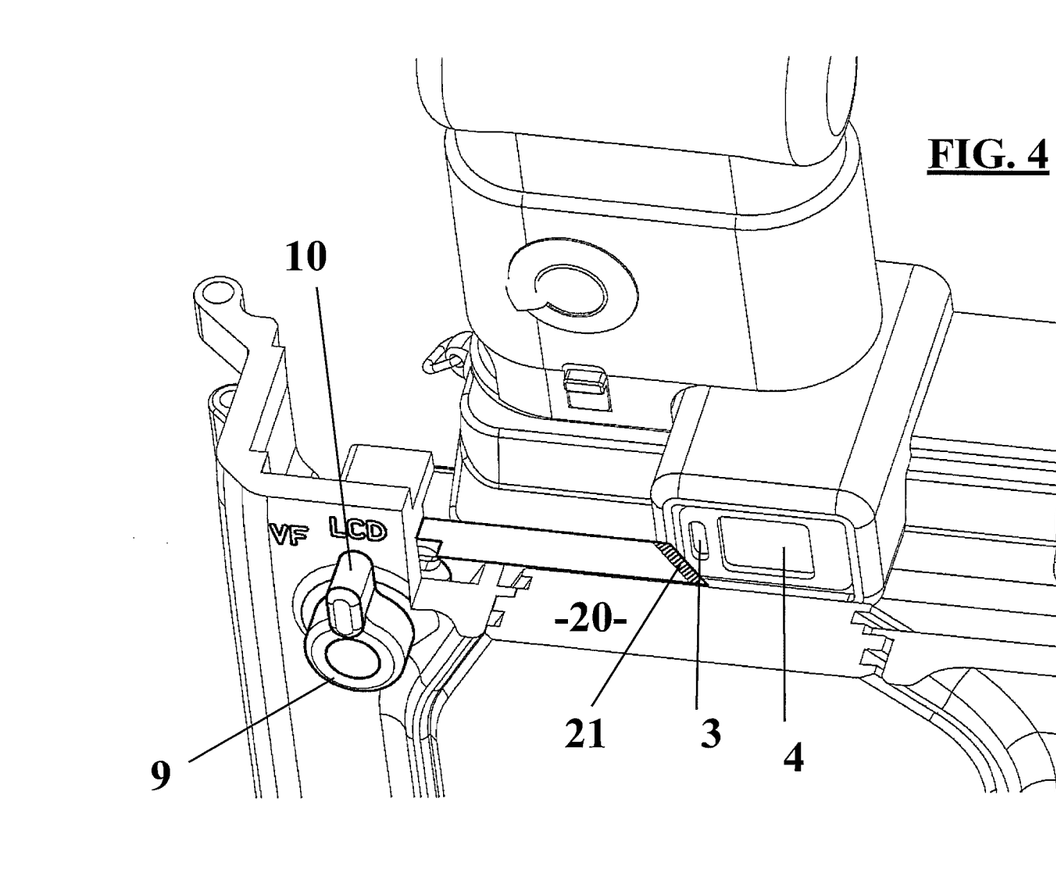
FIG. 4 is a view as for FIG. 1 of an alternative means to optionally allow or substantially prevent the operation of the proximity sensor in a first position.
Figure 5:
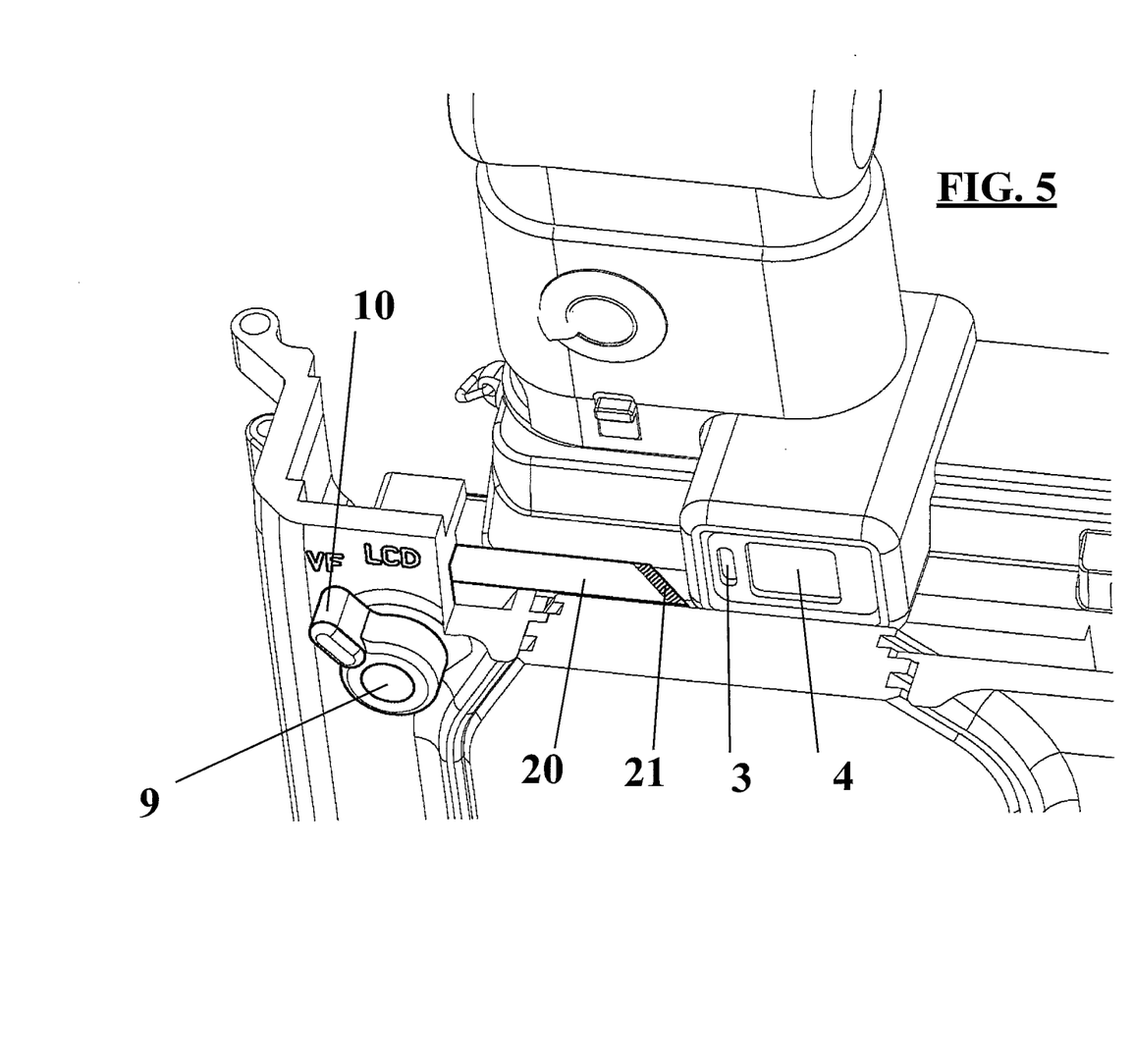
FIG. 5 is a view as in FIG. 4 with the means to optionally allow or substantially prevent the operation of the proximity sensor in a second position.

Thus by reference to FIGS. 4 to 7 a sliding block 20 is provided which carries a minor 21 which as shown in FIG. 4 is positioned close to proximity sensor 3 and as shown in FIG. 5 is withdrawn from that position. It can be seen that the knob 9 has been rotated and the tang 10 moved from "LCD" to "VF" between FIGS. 4 and 5.

Figure 6:
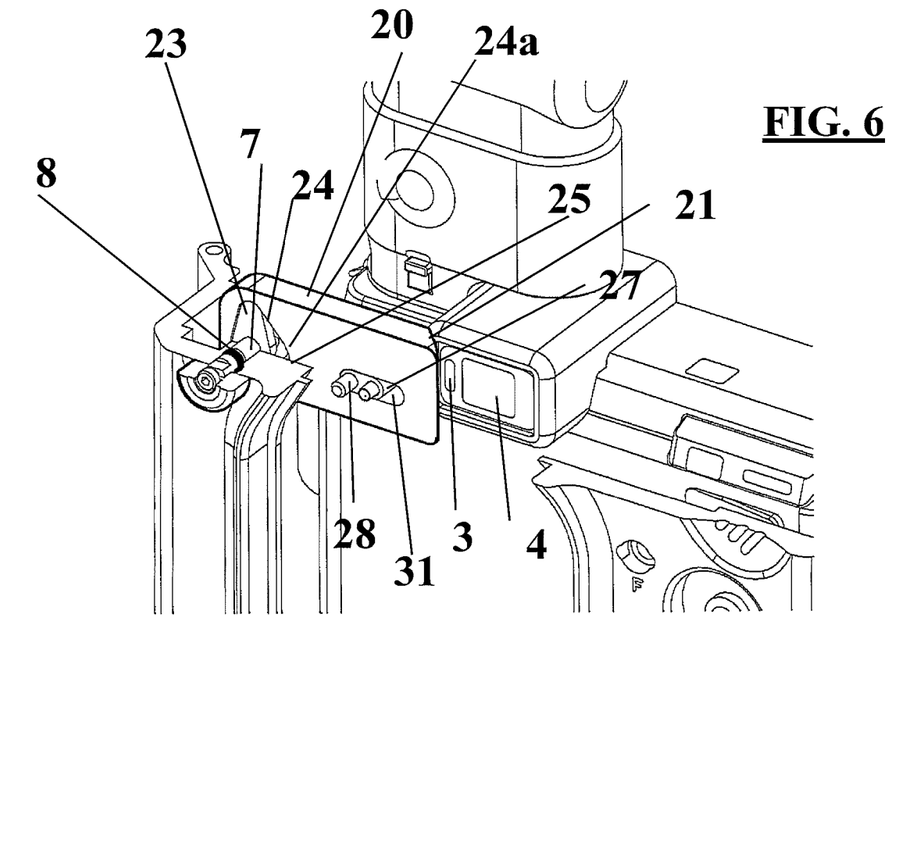
FIG. 6 is a view as in FIG. 4 showing further detail of the control mechanism.
Figure 7:
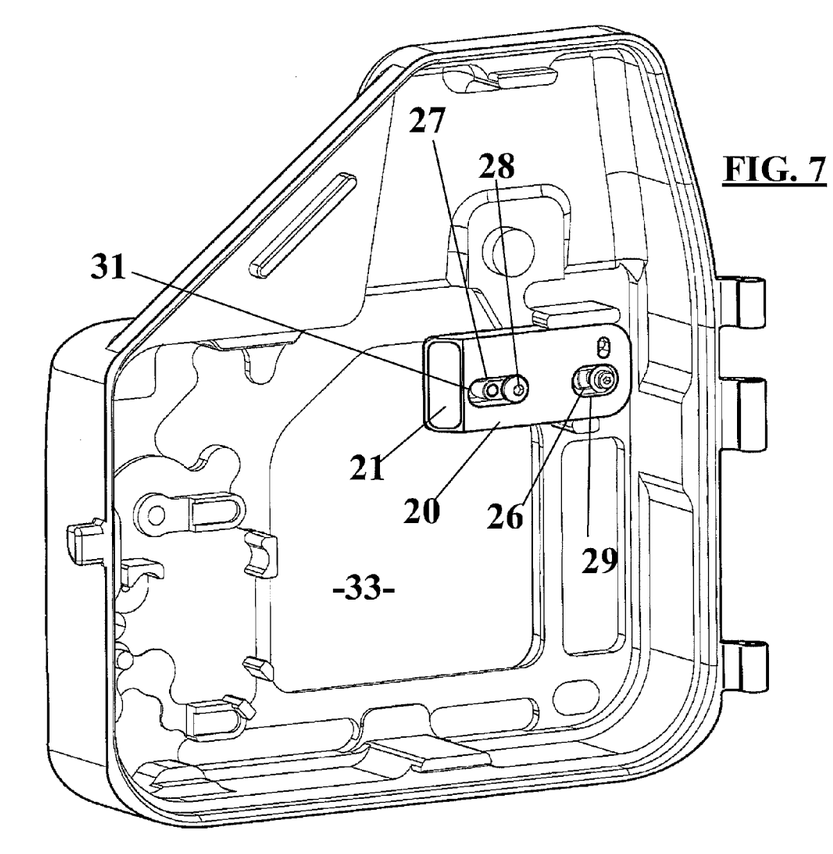
FIG. 7 is view of the second embodiment from inside the housing.

Again in this embodiment a shaft 7 sealed by an "O"-ring 8 may be provided and a mechanism is provided to convert the rotation of the shaft 7 to the longitudinal movement of the sliding block 20. Thus, for example, the shaft may carry a cam 23 which moves in a suitably shaped cut out 24 in the block 20. As shown in FIG. 6 the cam 23 is somewhat triangular but with rounded corners and the cut out 24 is shaped along face 24a so that as the cam 23 is rotated the corner 23a will bear on face 24a moving the sliding block 20, in the case of FIG. 6 to the right. Thus with cam 23 as shown in FIG. 6 the sliding block 20 is withdrawn but when the cam 23 is rotated into the cut out at 25 the block is pushed into the position shown in FIG. 4. A member 26 is provided on the housing 1 positioned in slot 29 in sliding block 20. Thus movement of the sliding block 20 causes the slot 29 to move relative to the member 26. This aids in keeping the block 20 in alignment. This is assisted by members 27 and 28 also provided on the housing 1 positioned in cut out 31 in the block 20 as seen in FIG. 7. Thus the members 26, 27 and 28 provide a guiding means for the sliding block 20 and also assist in retaining the block 20 in place on the housing 1.

As can be seen in FIG. 7 the mechanisms described can be mounted in the door parts 33 of the housing 1.

Again movement of the external control knob will switch the camera between EVF and monitor (LCD) positions.

Thus when a camera is correctly positioned inside a housing with the means to substantially allow or substantially prevent the operation of the camera proximity sensor positioned adjacent eh camera proximity sensor, the photographer can choose whether to let the signal return to the sensor by placing or removing the signal adsorbing or reflective surface, as the case may be, from in front of the sensor and hence switching on the EVF or the monitor respectively through an external control outside the housing.

ADVANTAGES

At least in a preferred form of the invention a user of a camera utilising an EVF can readily change the camera from EVF to Monitor positions from a position external of the underwater camera housing.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

What I claim is:

1. An underwater camera housing capable of receiving and holding a camera having an electronic viewfinder and a proximity sensor, the housing carrying means to optionally allow or substantially prevent the operation of the proximity sensor.

2. An underwater camera housing as claimed in claim 1 wherein the means to optionally allow or substantially prevent the operation of the proximity sensor comprises an absorbent material substantially non-reflective to electromagnetic waves emitted for receipt by the proximity sensor.

3. An underwater camera housing as claimed in claim 2 wherein the absorbent material is mounted on a shaft passing through the housing and is rotatable from a position exterior to the housing.

4. An underwater camera housing as claimed in claim 3 having a camera positioned therein, the means to optionally allow or prevent the operation of the proximity sensor being positioned adjacent the proximity sensor of the camera.

5. An underwater camera housing as claimed in claim 2 wherein the means to optionally allow or substantially prevent the operation of the proximity sensor is movable by a control mechanism accessible to a user from the exterior of the housing.

6. An underwater camera housing as claimed in claim 5 having a camera positioned therein, the means to optionally allow or prevent the operation of the proximity sensor being positioned adjacent the proximity sensor of the camera.

7. An underwater camera housing as claimed in claim 2 having a camera positioned therein, the means to optionally allow or prevent the operation of the proximity sensor being positioned adjacent the proximity sensor of the camera.

8. An underwater camera housing as claimed in claim 1 wherein the means to optionally allow or substantially prevent the operation of the proximity sensor comprises a substantially reflective device able to reflect sufficient electromagnetic waves emitted for receipt by the proximity sensor away from the proximity sensor so as to substantially prevent operation of the proximity sensor.

9. An underwater camera housing as claimed in claim 8 wherein the reflective device is a mirror.

10. An underwater camera housing as claimed in claim 9 wherein the means to optionally allow or substantially prevent the operation of the proximity sensor is movable by a control mechanism accessible to a user from the exterior of the housing.

11. An underwater camera housing as claimed in claim 9 wherein the reflective device is mounted on a sliding block movable from the exterior of the housing.

12. An underwater camera housing as claimed in claim 9 having a camera positioned therein, the means to optionally allow or prevent the operation of the proximity sensor being positioned adjacent the proximity sensor of the camera.

13. An underwater camera housing as claimed in claim 8 wherein the reflective device is mounted on a sliding block movable from the exterior of the housing.

14. An underwater camera housing as claimed in claim 13 having a camera positioned therein, the means to optionally allow or prevent the operation of the proximity sensor being positioned adjacent the proximity sensor of the camera.

15. An underwater camera housing as claimed in claim 8 wherein the means to optionally allow or substantially prevent the operation of the proximity sensor is movable by a control mechanism accessible to a user from the exterior of the housing.

16. An underwater camera housing as claimed in claim 8 having a camera positioned therein, the means to optionally allow or prevent the operation of the proximity sensor being positioned adjacent the proximity sensor of the camera.

17. An underwater camera housing as claimed in claim 1 wherein the means to optionally allow or substantially prevent the operation of the proximity sensor is movable by a control mechanism accessible to a user from the exterior of the housing.

18. An underwater camera housing as claimed in claim 17 having a camera positioned therein, the means to optionally allow or prevent the operation of the proximity sensor being positioned adjacent the proximity sensor of the camera.

19. An underwater camera housing as claimed in claim 1 having a camera positioned therein, the means to optionally allow or prevent the operation of the proximity sensor being positioned adjacent the proximity sensor of the camera.

20. A method of switching between an electronic viewfinder and a monitor of a camera within an underwater camera housing comprising the step of operating a mechanism from a point exterior to the housing which optionally allows or substantially prevents the operation of a proximity sensor mounted on the camera.

\* \* \* \* \*